(12) United States Patent
Sugaya

(10) Patent No.: US 8,913,600 B2
(45) Date of Patent: Dec. 16, 2014

(54) WIRELESS COMMUNICATION APPARATUS, SYSTEM, AND DEVICE COMMUNICATING WITH ANOTHER WIRELESS COMMUNICATION APPARATUS, SYSTEM, AND DEVICE IN AN AUTONOMOUS DISTRIBUTED NETWORK WITHOUT A DESIGNATED CONTROL STATION AND METHOD THEREOF

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 1821 days.

(21) Appl. No.: 10/506,461

(22) PCT Filed: Jan. 7, 2004

(86) PCT No.: PCT/JP2004/000021

§ 371 (c)(1),
(2), (4) Date: Jul. 11, 2005

(87) PCT Pub. No.: WO2004/062198

PCT Pub. Date: Jul. 22, 2004

(65) Prior Publication Data

US 2006/0056378 A1    Mar. 16, 2006

(30) Foreign Application Priority Data

Jan. 7, 2003   (JP) ................................ 2003-001177

(51) Int. Cl.
*H04J 3/00*      (2006.01)
*H04W 74/08*    (2009.01)
*H04W 88/02*    (2009.01)
*H04W 74/00*    (2009.01)

(52) U.S. Cl.
CPC .............. *H04W 74/08* (2013.01); *H04W 88/02* (2013.01); *H04W 74/002* (2013.01)
USPC ........... 370/345; 370/329; 370/312; 370/328; 370/368; 370/330; 455/11.1; 455/426.1; 455/450; 455/452.1

(58) Field of Classification Search
USPC ......... 370/348, 463, 345, 356, 347, 329, 312, 370/328, 315, 337, 330, 252, 254, 280, 310, 370/443; 709/203; 705/1; 455/1, 11.1, 455/426.1, 450, 452.1, 9
See application file for complete search history.

(56) References Cited

U.S. PATENT DOCUMENTS 5,577,087 A * 11/1996 Furuya .......................... 375/377
6,466,608 B1 * 10/2002 Hong et al. .................... 375/137

(Continued)

FOREIGN PATENT DOCUMENTS

EP      1 061 694 A2    12/2000
EP      1199848 A2       4/2002

(Continued)

OTHER PUBLICATIONS

Haartsen J: "Bluetooth—The Universal Radio Interface for Ad Hoc, Wireless Connectivity", Ericsson Review (Incl. On), Telefonaktiebolaget L M Ericsson, SE. No. 3, Jan. 1, 1998, pp. 110-117, XP 000783249.

(Continued)

*Primary Examiner* — Fred Casca
(74) *Attorney, Agent, or Firm* — Lerner, David, Littenberg, Krumholz & Mentlik, LLP

(57) ABSTRACT

A wireless communication apparatus, a wireless communication system, and a wireless communication method enabling any plurality of apparatuses to engage in time division multiplex communication for communicating a plurality of data even if not all apparatuses in the network are accurately synchronized, perform a time division multiplex connection method of an autonomous distributed network that performs a continuous receiving (scan) operation over a frame period so as to obtain a grasp of the wireless communication apparatuses located at the neighborhood at predetermined periods, that includes the steps of receiving beacon signals from other wireless communication apparatuses to obtain a grasp of the wireless communication apparatuses that they are communicable with, calculating the reception slot of the wireless communication apparatus from the received beacon information, setting its own reception slot so as not to collide with the set situation thereof, and forming network autonomously engaging in time division multiplex communication with other wireless communication apparatuses located at the neighborhood.

24 Claims, 7 Drawing Sheets

(56) References Cited

U.S. PATENT DOCUMENTS

| | | | |
|---|---|---|---|
| 7,010,323 B2* | 3/2006 | Suwa | 455/552.1 |
| 7,103,371 B1* | 9/2006 | Liu | 455/456.4 |
| 7,340,612 B1* | 3/2008 | Durand et al. | 713/182 |
| 2001/0015964 A1* | 8/2001 | Fuchisawa | 370/332 |
| 2002/0032025 A1 | 3/2002 | Maeshima et al. | |
| 2002/0061031 A1* | 5/2002 | Sugar et al. | 370/466 |
| 2002/0159544 A1* | 10/2002 | Karaoguz | 375/329 |
| 2003/0087603 A1* | 5/2003 | Li et al. | 455/63 |
| 2003/0114204 A1* | 6/2003 | Allen et al. | 455/574 |
| 2004/0017495 A1* | 1/2004 | Funakoshi et al. | 348/308 |
| 2004/0050238 A1* | 3/2004 | Okamura | 84/604 |
| 2004/0246932 A1* | 12/2004 | Fischer | 370/338 |
| 2006/0044436 A1* | 3/2006 | Watanabe | 348/308 |

FOREIGN PATENT DOCUMENTS

| | | |
|---|---|---|
| JP | 56-086547 | 7/1981 |
| JP | 2000-358059 | 12/2000 |
| JP | 2002-223217 | 8/2002 |
| JP | 2003-229869 | 8/2003 |

OTHER PUBLICATIONS

Jeyhan Karaoguzkaraoguz: "High-Rate Wireless Personal Area Networks", IEEE Communications Magazine, IEEE Service Center, Piscataway, US, vol. 39, No. 12, Dec. 1, 2001, pp. 96-102, XP 011091866.

Supplementary European Search Report EP 04700503, dated Jan. 24, 2011.

Office Action from Korea Application No. KR 10-04-7013936, dated Aug. 28, 2010.

"A Short Look on Power Saving Mechanisms in the Wireless LAN Standard Dradt IEEE802.11" WINLAB Workshop on Third generation Wireless System, Mar. 1997.

* cited by examiner

WIRELESS COMMUNICATION APPARATUS, SYSTEM, AND DEVICE COMMUNICATING WITH ANOTHER WIRELESS COMMUNICATION APPARATUS, SYSTEM, AND DEVICE IN AN AUTONOMOUS DISTRIBUTED NETWORK WITHOUT A DESIGNATED CONTROL STATION AND METHOD THEREOF

TECHNICAL FIELD

The present invention relates to a wireless communication apparatus, a wireless communication system, and a wireless communication method employing a time division multiplex connection method based on asynchronous control of communication apparatuses in an autonomous distributed network.

BACKGROUND ART

At present, the method of administration by direct communication by terminal stations without arranging a base station in a network like an ad hoc mode of a wireless local area network (wireless LAN) based on the IEEE802.11 standard is known.

Further, in recent years, as a technology enabling data communication at a close distance at an ultra-high speed, unlike a communication system which has conventionally used a certain specific carrier, ultra-wide band wireless communication for transmitting information carried on a very short pulse sequence is attracting attention.

This ultra-wide band wireless communication can directly and wirelessly transmit a baseband signal, so enables a simple circuit configuration and is mentioned as a strong candidate for a personal area network assuming a data transmission rate of about 100 Mbps.

Further, as a conventional time division multiplex connection method, as used in mobile phone and other systems, the method of arranging a base station in the network and making all moving terminal stations perform time divisional multiplex connections in synchronization with signals from the base station is generally known.

In order for a plurality of apparatuses to simultaneously engage in ultra-wide band communications, the method of time division multiplex connection has generally been considered.

Further, in order to form a wireless network among a plurality of apparatuses, the method of arranging a control station referred to as a "coordinator" at the center of the network and utilizing central management by the control station for time division multiplexing of time for which a plurality of apparatuses engage in ultra-wide band communication is generally known (IEEE802.15.3).

In the recently hot ultra-wide band communication, however, an extremely weak pulse sequence was used for communication, so there was the disadvantage that easy configuration of the means for detecting the carrier which had been utilized in the conventional wireless system was hard.

Further, in the conventional ad hoc mode of a wireless LAN, it was not necessary to establish synchronization among all terminals, but there was the disadvantage that a means for detecting the carrier was necessary before transmitting information so as to prevent collision with communication of other terminals. Accordingly, the technology cannot be utilized for wireless communication.

Further, when using a plurality of terminals operating in the ad hoc mode of a wireless LAN to form a network, since it was not known when information would arrive from another terminal, it was necessary to constantly operate to be ready to receive signals, therefore there was the disadvantage that reduction of the power consumption was difficult.

Further, when operating in the ad hoc mode, since other apparatuses were not constantly synchronized with, there was the disadvantage that time division multiplex communication was hard when a plurality of communication links repeatedly transferred information in a predetermined period.

In conventional mobile phone and other time division multiplex communication systems, in order to avoid collision of slots divided in time, all terminals in the system had to be synchronized with the base station, so it was necessary to mount sophisticated mechanisms enabling all terminal stations to synchronize with the base station.

Further, when communicating by time division multiplexing in a conventional wireless network, it was necessary to arrange a control station referred to as a "coordinator" at the center of the network and have the control station centrally manage operations.

DISCLOSURE OF THE INVENTION

A first object of the present invention is to provide a wireless communication apparatus, a wireless communication system, and a wireless communication method enabling any plurality of apparatuses to engage in time division multiplex communication for a plurality of data communications even without all apparatuses inside the network correcting synchronizing.

A second object of the present invention is to provide a wireless communication apparatus, a wireless communication system, and a wireless communication method enabling easy time division multiplex communication when any communication apparatuses form a network ad hoc.

A third object of the present invention is to provide a wireless communication apparatus, a wireless communication system, and a wireless communication method enabling access control without arranging a specific control device in ultra-wide band wireless communication.

A fourth object of the present invention is to provide a wireless communication apparatus, a wireless communication system, and a wireless communication method enabling a receiving operation only when required without always engaging in a receiving operation and accordingly enabling easy reduction of the power consumption.

To attain the above objects, a first aspect of the present invention is a wireless communication apparatus communicating with another wireless communication apparatus in an autonomous distributed network without any specific control station apparatus, the wireless communication apparatus comprising a frame period setting means for setting a predetermined frame period by each wireless communication apparatus; a data slot setting means for setting slots serving as data transmission units; and a reception slot setting means for setting at least one reception slot for receiving a signal in the frame period.

Preferably, it further comprises a transmitting means for transmitting a beacon signal to another wireless communication apparatus at a predetermined timing of the frame period, which beacon has information about a timing of the reception slot set by the reception slot setting means and a receiving means for receiving a signal which is transmitted by another wireless communication apparatus.

Preferably, the receiving means receives signal at a timing of the reception slot set by the reception slot setting means.

A second aspect of the present invention is a wireless communication apparatus for communicating with another wireless communication apparatus in an autonomous distributed network without any specific control station apparatus, the wireless communication apparatus comprising a frame period setting means for setting a predetermined frame period; a data slot setting means for setting slots serving as data transmission units; a scan period setting means for setting any scan period longer than the frame period; and a scanning means for receiving a beacon signal transmitted from another wireless communication apparatus over a time of the frame period unit.

Preferably, it further comprises a managing means for converting the timing of the received beacon signal and the timing of the reception slot into its own slot positions and a transmitting means for transmitting a signal at the timing of the reception slot of the corresponding wireless communication apparatus when there is data directed to another wireless communication apparatus.

Preferably, it further comprises a control means for making the transmitting means transmits a signal at the timing of the reception slot of the corresponding wireless communication apparatus when there is data directed to the other wireless communication apparatus, the scanning means obtaining the timing of the beacon signal and the timing of the reception slot from the other wireless communication apparatus.

A third aspect of the present invention is a wireless communication system for communication among a plurality of wireless communication apparatuses in an autonomous distributed network without a specific control station apparatus, wherein each of the wireless communication apparatuses configuring the network comprises a frame period setting means for setting a predetermined frame period; a data slot setting means for setting slots serving as data transmission units; a beacon slot setting means for setting beacon slots for transmitting beacon signals at a predetermined timing of the frame period; and a reception slot setting means for setting at least one reception slot for the receiving operation in the frame period.

Preferably, it transmits the beacon signal at the timing of the head of the frame period.

Preferably, timings by which wireless communication apparatuses transmit beacons are arranged so as not to overlap each other.

A fourth aspect of the present invention is a wireless communication method for communication among a plurality of wireless communication apparatuses in an autonomous distributed network without a specific control station apparatus, wherein each wireless communication apparatus sets a predetermined frame period and slots serving as data transmission units and sets at least one beacon slot for transmitting the beacon signal at a predetermined timing of the frame period and reception slot for the receiving operation in the frame period.

Preferably, it transmits a beacon signal which has information about the timing of the set reception slot and informs the presence to another wireless communication apparatus located in the neighborhood.

A fifth aspect of the present invention is a wireless communication method for communication among a plurality of wireless communication apparatuses in an autonomous distributed network without a specific control station apparatus, wherein each wireless communication apparatus sets a predetermined frame period and slots serving as data transmission units, provides any scan period longer than the frame period, performs scan processing for continuous reception over the time of the frame period unit, and receives a beacon signal transmitted from another wireless communication apparatus located in the neighborhood.

Preferably, it manages the timing of the reception of the beacon signal transmitted from the other wireless communication apparatus and the timing of the reception slot.

A sixth aspect of the present invention is a wireless communication method for communication among a plurality of wireless communication apparatuses in an autonomous distributed network without a specific control station apparatus, comprising, at each wireless communication apparatus, the steps of: setting a predetermined frame period and slots serving as data transmission units, setting at least one beacon slot for transmitting a beacon signal at a timing of the head of the frame period and a reception slot for a receiving operation in the frame period, transmitting a beacon signal which has information about the timing of the set reception slot and notifies existence to another communication apparatus located in the neighborhood, setting any scan period longer than the frame period, and performing scan processing for continuous reception over the time of the frame period unit.

Preferably, it receives the beacon signal of another wireless communication apparatus located in the neighborhood, manages the timing of the reception of the beacon signal and the timing of the reception slot, and transmits a signal at the timing of the reception slot of the corresponding wireless communication apparatus when communicating directed to another wireless communication apparatus.

According to the present invention, by providing a frame period common to all apparatuses, dividing the frame to slots of further shorter time units, setting at least one beacon slot to be periodically transmitted at a timing of the head of the frame period set by itself and a reception slot received by itself, writing the position of the reception slot in the beacon information and transmitting the beacon, and thereby notifying another apparatus located at the neighborhood.

Further, each apparatus provides any scan period with a period longer than the frame period. When that period passes, it engages in a receiving operation over the frame period, receives the beacon from an apparatus located at the neighborhood, and confirms the apparatus located at the neighborhood.

Then, each apparatus repeatedly and periodically engages in reception processing when the timing of the reception slot arrives.

At least one reception slot may be provided in the frame period, but a plurality of reception slots can be provided according to the need of the apparatuses as well.

When transmitting data to a certain apparatus, the invention transmits data at the timing of the position of the reception slot written in the beacon signal from a surrounding apparatus from which a signal can be received by the scanning.

The apparatus receiving the data can employ a configuration also capable of handling large capacity data communication by addition of a reception slot whenever addition becomes necessary.

BEST MODE FOR WORKING THE INVENTION

Below, embodiments of the present invention will be explained with reference to the attached drawings.

Figure 1:
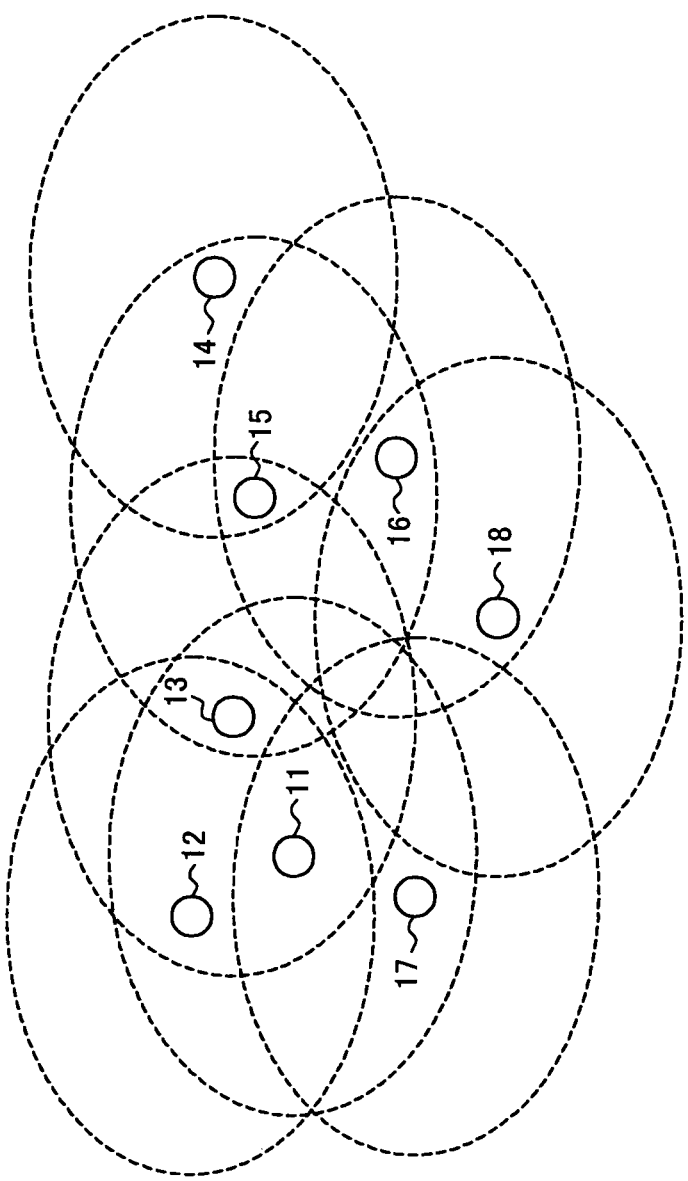
FIG. 1 is a view of an example of the arrangement of communication apparatuses configuring a wireless communication system according to the present invention.

FIG. 1 is a view of an example of the arrangement of communication apparatuses configuring a wireless communication system according to the present invention.

A wireless communication system 10 of the example of FIG. 1 shows a case where there are eight wireless communication apparatuses 11 to 18.

Namely, FIG. 1 shows the situation where the wireless communication apparatus 11 to the wireless communication apparatus 18 are distributed in the same space.

Further, in FIG. 1, the communication ranges of the wireless communication apparatuses 11 to 18 are indicated by broken lines. These are defined as ranges where not only is communication with other wireless communication apparatuses within those ranges possible, but also where signals transmitted by oneself cause interference.

In the wireless communication system 10 of FIG. 1, the wireless communication apparatus 11 is in a range capable of communicating with the neighboring wireless communication apparatuses 12, 13, and 17.

The wireless communication apparatus 12 is in a range capable of communicating with the neighboring wireless communication apparatuses 11 and 13.

The wireless communication apparatus 13 is in a range capable of communicating with the neighboring wireless communication apparatuses 11, 12, and 15.

The wireless communication apparatus 14 is in a range capable of communicating with the neighboring wireless communication apparatus 15.

The wireless communication apparatus 15 is in a range capable of communicating with the neighboring wireless communication apparatuses 13, 14, and 16.

The wireless communication apparatus 16 is in a range capable of communicating with the neighboring wireless communication apparatuses 15 and 18.

The wireless communication apparatus 17 is in a range capable of communicating with the neighboring wireless communication apparatus 11.

The wireless communication apparatus 18 is in a range capable of communicating with the neighboring wireless communication apparatus 16.

The wireless communication system 10 according to the present embodiment employs an access control method where the wireless communication apparatuses 11 to 18 utilize one wireless transmission channel in a time division manner while considering interference with other wireless communication apparatuses around them.

Figure 2:
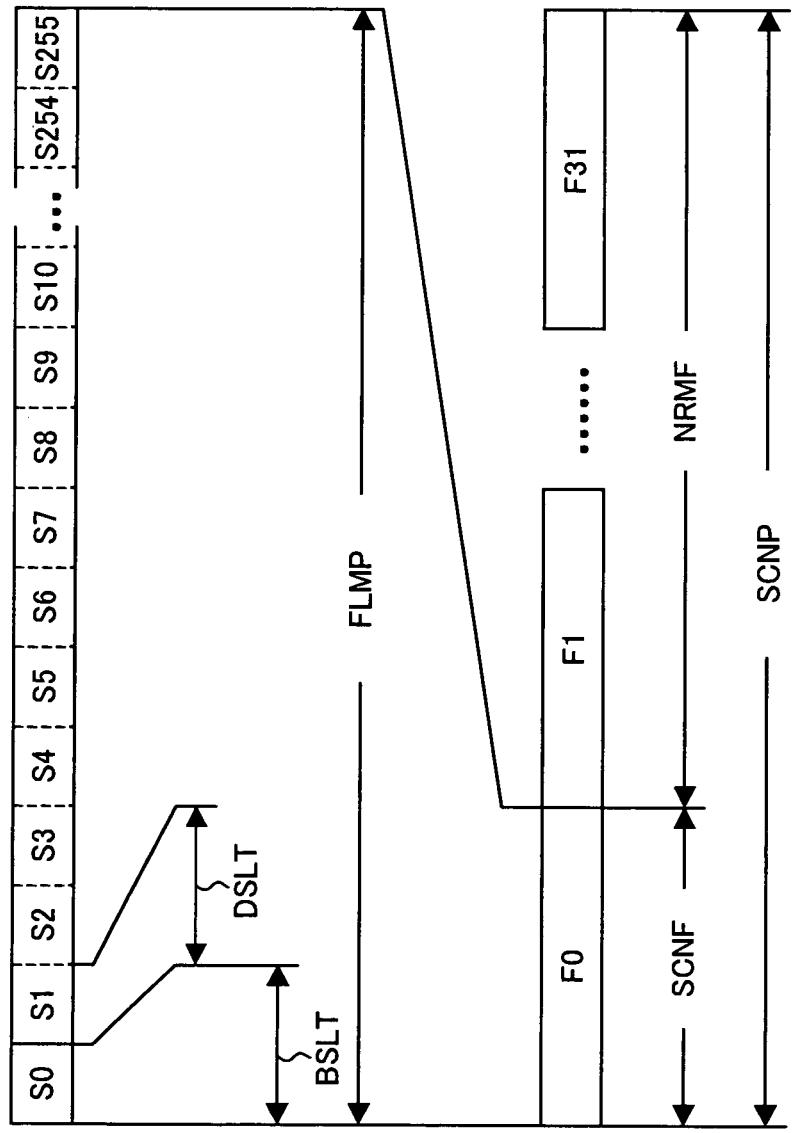
FIG. 2 is a view of the configuration of a frame period and the configuration of a scan period employed in a wireless communication apparatus according to the present embodiment.

FIG. 2 is a view of the configuration of a frame period and the configuration of a scan period employed in a wireless communication system according to the present embodiment.

In the present embodiment, as shown in FIG. 2, a beacon slot (S0: BSLT) for transmitting the beacon at a predetermined timing and data slots (S1 to S255: DSLT) for receiving the data are arranged. A total of 256 slots together form a frame period FLMP. A frame period FLMP is set at for example 30 ms to 40 ms.

This frame period FLMP is provided with a scan frame SCNF and a normal frame NRMF. Each wireless communication apparatus is configured to perform a scan operation for obtaining a grasp of the existence of a surrounding wireless communication apparatus in a scan frame SCNF.

32 frames of this scan frame SCNF (F0) and normal frames NRMF (F1 to F31) together form the scan period SCNP.

Note that the parameters of the number of slots and the number of frames indicated here are numerical values set for convenience and are not limited to the numerical values indicated here.

FIGS. 3A to 3E are views concretely showing a series of operations of the wireless communication system 10 of FIG. 1 by time series.

These show operations in the wireless communication apparatus 13 at the position of FIG. 1 in comparison with the communication apparatuses 11, 12, and 15 located at its periphery.

Figures 3A, 3B, 3C, 3D, 3E:
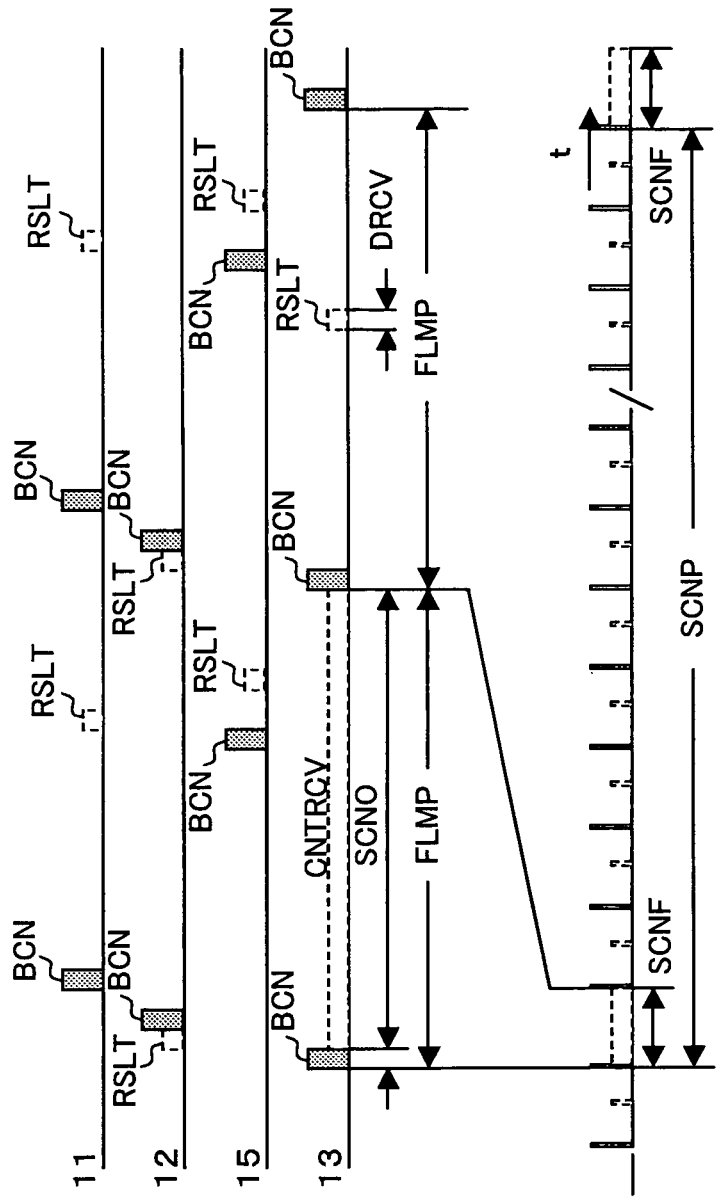
FIGS. 3A to 3E are charts concretely showing a series of operations of the wireless communication system of FIG. 1 in a time series.

FIG. 3A shows the communication state of the wireless communication apparatus 11; FIG. 3B shows the communication state of the wireless communication apparatus 12; FIG. 3C shows the communication state of the wireless communication apparatus 15; and FIG. 3D and FIG. 3E show the concrete operation state of the wireless communication apparatus 13.

Note that, in FIG. 3A to FIG. 3E, BCN indicates a beacon, RSLT indicates a reception slot, CNTRCV indicates continuous reception, SCNO indicates a scan operation, and DRCV indicates data reception. Further, FLMP indicates a frame period and designates a period from a beacon transmitted by a wireless communication apparatus up to the beacon transmitted by the next wireless communication apparatus (super frame). SCNF indicates a scan frame, SCNP indicates a scan period, and t indicates the time.

Further, as shown in FIG. 3A to FIG. 3D, the beacon transmission positions of the wireless communication apparatuses 11, 12, 13, and 15 are arranged so as not to overlap each other. This is done in order to avoid collision among beacons. Accordingly, the head positions of the frame periods set by the wireless communication apparatuses are arranged shifted from each other.

As shown in FIG. 3D and FIG. 3E, the wireless communication apparatus 13 transmits the beacon BCN in the frame period FLMP set in advance, engages in a continuous receiving operation (CNTRCV) in the scan period SCNF set in advance, and engages in a scan operation (SCNO).

At this time, it receives the beacon signal of the wireless communication apparatus 12, the beacon signal of the wireless communication apparatus 11, and the beacon signal of the wireless communication apparatus 15 located at its periphery as shown in FIG. 3A to FIG. 3C.

It can obtain a grasp of the reception slot RSLT set by each wireless communication apparatus by these beacon signals.

The wireless communication apparatus 13, as shown in FIG. 3A to FIG. 3D, arranges its own reception slot RSLT 13 at a position not colliding with the reception slots RSLTs of these wireless communication apparatuses 11, 12, and 15 at its periphery and transmits the setting by the next beacon information BCN13 transmitted by itself to the surrounding wireless communication apparatuses 11, 12, and 15.

By performing a series of operations for each scan period FLMP, it is possible to arrange the slot for transferring data while obtaining a grasp of the existence of surrounding wireless communication apparatuses.

Here, this wireless communication apparatus 13 can receive data from the other wireless communication apparatuses 11, 12, and 15 located at the neighborhood by receiving data at the timing of the reception slot set by itself.

Further, when it is necessary to transmit data toward the other communication apparatuses 11, 12, and 15, this wireless communication apparatus 13 can engage in a transmitting operation of data matching the timing of the reception slot of the destination wireless communication apparatus so as to transmit data without collision with communication from other wireless communication apparatuses.

Note that, in the above example, the example of writing in a beacon signal the reception slot RSLT set by the wireless communication apparatus and informing the other wireless communication apparatuses of one's own reception slot was explained, but it is also possible to determine a predetermined slot of the frame as the reception slot in advance. For example, when wireless communication terminals belonging to the network transmit beacons at timings shifted from each other, and a predetermined period immediately after the transmission of a beacon is determined as the reception slot of the beacon transmitting terminal, there is no longer a need for writing the timing of the reception slot in the beacon and informing this as in the above example.

In this case, if controlling the arrangement of beacons transmitted by the wireless communication apparatuses so as not to overlap each other, the reception slot started along with this can avoid collision.

An example of controlling the arrangement of beacons transmitted by the wireless communication apparatuses so as not to overlap each other will be explained. The positions of the beacons from the other wireless communication apparatuses which an apparatus can receive by a scan operation are grasped at a relative time from one's own beacon transmitting time and stored in a storage means. Then, the stored beacon transmitting positions from the other wireless communication apparatuses are written in one's own beacon and informed to the surrounding wireless communication apparatuses. The surrounding wireless communication apparatuses obtaining that information avoid timings which have been already used as the beacon transmitting timings by wireless communication apparatuses other than itself in the frame period and start the frame period. As a result, beacons can be arranged so that the beacon transmission positions of the wireless communication terminals do not overlap each other as shown in FIG. 3A to FIG. 3D.

Below, an explanation will be given of a concrete example of the configuration of a wireless communication apparatus according to the present embodiment.

Figure 4:
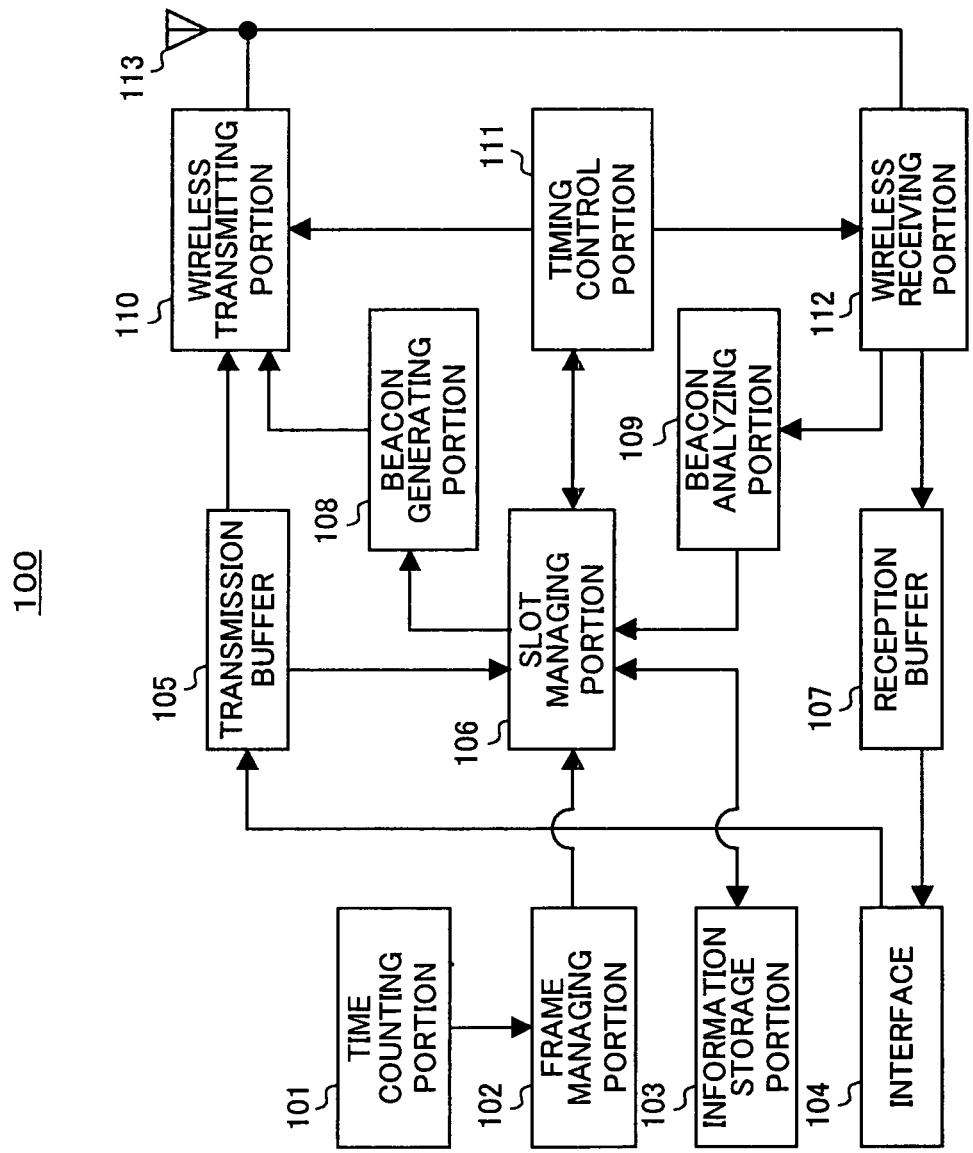
FIG. 4 is a view of the configuration of an embodiment of a wireless communication apparatus according to the present invention.

FIG. 4 is a view of the configuration of an embodiment of a wireless communication apparatus according to the present invention.

The wireless communication apparatuses 11 to 18 of FIG. 1 have the same configuration, so the wireless communication apparatuses are represented by the notation 100 here.

This wireless communication apparatus 100, as shown in FIG. 4, has a time counting portion 101, a frame managing portion 102, an information storage portion 103, an interface 104, a transmission buffer 105, a slot managing portion 106, a reception buffer 107, a beacon generating portion 108, a beacon analyzing portion 109, a wireless transmitting portion 110, a timing control portion 111, a wireless receiving portion 112, and an antenna 113.

Note that for example the frame managing portion 102 configures the frame period setting means and the scan period setting means, and the slot managing portion 106 and the beacon generating portion 108 etc. configure the reception slot setting means.

The time counting portion 101 includes for example a counter, counts times of the frame period FLIMP common to all apparatuses and the scan period SCNP, etc. and outputs the counting result to the frame managing portion 102.

The frame managing portion 102 sets the frame period FLMP set by this wireless communication apparatus 100 and its start time and the scan period SCNP.

The information storage portion 103 stores the information of the beacon transmission position and the reception slot position of the wireless communication apparatus located at the neighborhood under the management of the slot managing portion 106.

The interface 104 becomes the input/output terminal between a not illustrated application device connected to this wireless communication apparatus 100 and the transmission buffer 105 and reception buffer 107.

The transmission buffer 105 stores the information to be transmitted from the application device connected via the interface 104.

When receiving a data transmission request via the interface 104 when transmitting data, the transmission buffer 105 notifies the information including the destination information of the data to the slot managing portion 106.

The slot managing portion 106 designates the reception slot of this wireless communication apparatus 100 and the slot for transmission directed to the other wireless communication apparatuses.

The slot managing portion 106 fits the timing information from individual wireless communication apparatuses to the slots of its own frame period FLMP and stores the same as the timing information of the wireless communication apparatuses located at its own neighborhood in the information storage portion 103.

The reception buffer 107 stores the information wirelessly received for delivering the information to the application device connected.

The beacon generating portion 108 generates the identifier of this wireless communication apparatus 100 and the set reception slot as a beacon signal based on an instruction of the slot managing portion 106.

The beacon analyzing portion 109 analyzes the timings of the beacons and the reception slots from the received beacon signals and outputs the analysis results to the slot managing portion 106.

The wireless transmitting portion 110 modulates the beacon and the transmission data to be transmitted to convert them to a wireless transmission signal and emits the wireless signal through the antenna 113 to the transmission medium (air) at the timing designated by the timing control portion 111.

The timing control portion 111 designates the transmission timing in the wireless transmitting portion 110 by the instruction of the slot managing portion 106 and designates the timing for reception in the wireless receiving portion 112.

The wireless receiving portion 112 receives the signal sent from the other wireless communication apparatus via the antenna 113 at the predetermined timing designated by the timing control portion 111.

The antenna 113 emits the wireless signal from the wireless transmitting portion 110 into the transmission medium (air), receives the wireless signal from the transmission medium (air), and supplies the same to the wireless receiving portion 112.

The wireless communication apparatus 100 having the above configuration receives a notification from the time counting portion 111 when the scan period arrives. The frame managing portion 102 notifies the reception of a whole frame to the slot managing portion 106. The slot managing portion 106 issues an instruction to the timing control portion 111 and thereby makes the wireless receiving portion 112 operate over the predetermined time.

The beacon signals received at the wireless receiving portion 112 are analyzed in the beacon analyzing portion 109, then information of the timings of the beacons and the timings of the reception slots of the wireless communication apparatuses is notified to the slot managing portion 106.

The slot managing portion 106 fits the timing information from these individual wireless communication apparatuses to the slots of its frame period FLMP and stores the same as the timing information of the wireless communication apparatuses located at the neighborhood in the information storage portion 103.

Further, when transmitting a beacon, the frame managing portion 102 delivers an instruction for transmitting the beacon at the timing of the head of the frame to the slot managing portion 106. The slot managing portion 106 requests the generating portion of the beacon signal to the beacon generating 108 and notifies the timing of its own reception slot to the timing control portion 111.

The beacon generating portion 108 generates a beacon signal writing the position of its own reception slot.

Then, the timing control portion 111 transfers an instruction for wireless transmission to the wireless transmitting portion 110 when the timing of the head of the frame arrives, whereupon the wireless transmitting portion 110 transmits the beacon via the antenna 113.

When transmitting data, first the transmission buffer 105 receives a data transmission request via the interface 104 and notifies information including the destination information of the data to the slot managing portion 106.

The slot managing portion 106 refers to the timing of the reception slot of the destination wireless communication apparatus from the storage information of the information storage portion 103. If the reception slot is set, it sends the timing to the timing control portion 111.

When the timing of the predetermined slot arrives, the timing control portion 111 transfers the instruction for wireless transmission to the wireless transmitting portion 110. Due to this, the wireless transmitting portion 110 transmits the data to be transmitted via the antenna 113.

When receiving data, first the slot managing portion 106 notifies the timing of its own reception slot to the timing control portion 111 which then makes the wireless receiving portion 112 operate at the timing of the reception slot.

The data signal received at the wireless receiving portion 112 is stored in the reception buffer 107. The data is delivered to an application device connected to the wireless communication apparatus 100 via the interface 104 at the predetermined timing when constant data can be correctly collected.

Figure 5:
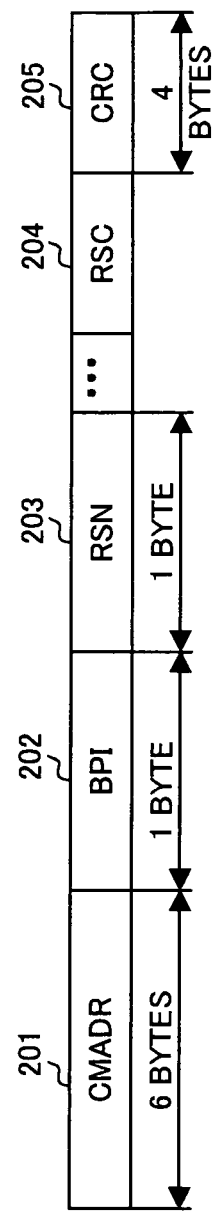
FIG. 5 is a view of an example of the configuration of beacon information according to the present embodiment.

FIG. 5 is a view of an example of the configuration of the beacon information according to the present embodiment.

This beacon information 200 may be configured by information distinctive to a wireless communication apparatus such as a communication apparatus address (CMADR) 201 like a MAC address, beacon period information (BPI) 202 indicating the beacon transmission period of this wireless communication apparatus, reception slot information (RSN) 203 representing the timing set as the reception slot, and further, according to need, the reception slot information.

Further, it is configured provided with a reservation region (RSV) 204 until the predetermined information length and a CRC 205 for detecting the error added to the tail.

Note that here, for convenience, the general value of the length of each information is additionally shown.

In FIG. 5, the communication apparatus address (CMADR) 201 is indicated as 6 bytes, the beacon period information (BPI) 202 is indicated as 1 byte, and the reception slot information (RSN) 203 is indicated as 1 byte.

Figure 6:
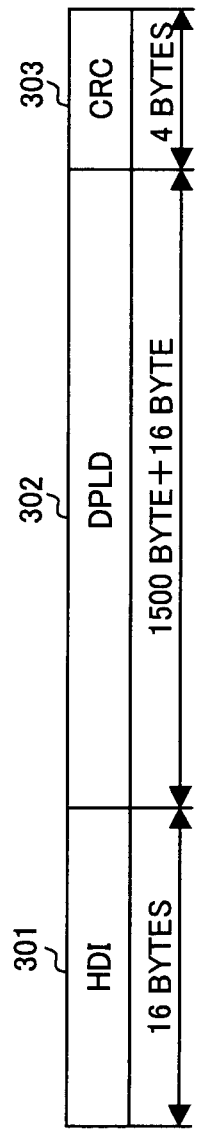
FIG. 6 is a view of an example of the configuration of data information according to the present embodiment.

FIG. 6 is a view of an example of the configuration of the data information according to the present embodiment.

This data information 300 is comprised of MAC header information (HDI) 301 including for example the destination address information, a data payload (DPLD) 302 as the content of the data to be transmitted, and a CRC 303 for detecting error added to the tail.

Note that here, for convenience, the general value of the length of each information is additionally shown.

In FIG. 6, the data payload (DPLD) 302 is envisioned as having a capacity of about 1500 bytes as a size by which an IP packet can be transmitted well.

Figure 7:
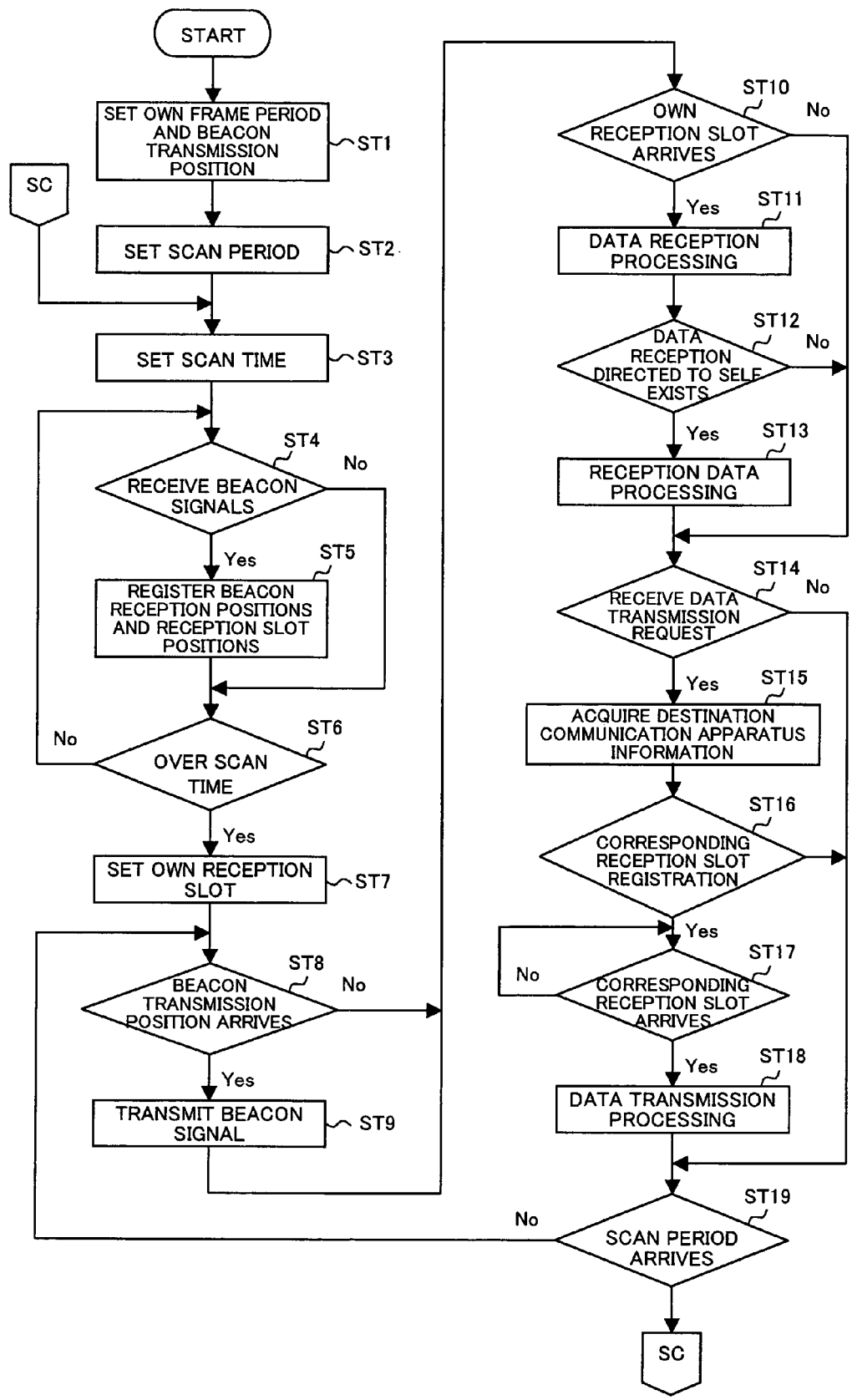
FIG. 7 is a flow chart for explaining a series of operations of a wireless communication apparatus according to the present embodiment.

Next, the series of operations of the wireless communication apparatus 100 having the above configuration will be explained with reference to the flow chart of FIG. 7.

First, after the power is turned on, the wireless communication apparatus 100 sets its own frame period FLMP and beacon transmission position and also sets the scan period SCNP.

Then, it sets the scan time over the frame period FLMP (ST3) and enters into the beacon receiving operation (ST4).

Here, if receiving beacons, the received positions (timings) are calculated and recorded from the beacon reception positions (timings) and the reception slot information written in those beacons (ST5).

On the other hand, when it is decided at step ST4 that no beacons were received, the routine shifts to the processing of step ST6.

At step ST6, it is decided whether or not the scan time has passed. If the scan time has not passed, the routine returns to the processing of step ST4. If the scan time has passed, the routine shifts to the processing of step ST7.

Further, the apparatus sets its own reception slot so as to avoid collision with the reception slot positions of these other wireless communication apparatuses and writes this as the beacon information (ST7).

Then, the apparatus decides whether or not the timing of the transmission position of the beacon (head of frame) has arrives (ST8) and transmits the beacon signal only when the timing arrives (ST9).

The reception processing at one's own reception slot decides whether or not its own reception slot has arrived (ST10), activates the wireless receiving portion 112 when the reception slot arrives, and engages in the reception processing (ST11).

Here, it decides whether or not data directed to itself has been received (ST12). If received, it stores the data in the reception buffer 107 (ST13), then the routine shifts to the processing of step ST14. When receiving beacons of other wireless communication apparatuses at this time, it may engage in the beacon reception processing.

The routine shifts to the processing of step ST14 both when the reception slot does not arrive in the decision of step ST10 and when data directed to itself was not received in the decision of step ST12.

The transmission processing for transmitting data decides whether or not a data transmission request was received by the transmission buffer 105 via the interface 104 (ST14).

It then acquires address information of the destination wireless communication apparatus based on the request (ST15).

Then, it decides whether or not the reception slot information of the wireless communication apparatus corresponding to the address is registered (ST16) and sets the transmission at that timing when registered.

That is, it decides whether or not the timing of the reception slot of the corresponding wireless communication apparatus has arrived (ST17) and performs the data transmission processing only when the timing has arrived (ST18). Then, the routine shifts to the processing of step ST19.

Here, even when the decision of step ST14 is that there is no data transmission request and the reception slot of the corresponding wireless communication apparatus is not registered, the routine shifts to the processing of step ST19.

At step ST19, it decides whether or not the scan period set at step ST2 has arrived. When it has not arrived, the routine shifts to the processing of step ST8, where it transmits the beacon at the timing for periodically transmitting the beacon and engages in the receiving operation for the reception slot.

Further, when the scan period arrives, the routine shifts to the processing of step ST3, where it performs the scan operation for obtaining a grasp of the existence of the surrounding wireless communication apparatuses again.

As explained above, according to the present embodiment, the time division multiplex connection method of an autonomous distributed network comprises performing a continuous receiving (scan) operation over a frame period so that each wireless communication apparatus can obtain a grasp of the wireless communication apparatuses located at the neighborhood at predetermined periods, receiving beacon signals from other wireless communication apparatuses to obtain a grasp of the wireless communication apparatuses communicable with, calculating the reception slot of the wireless communication apparatus from the received beacon information, setting a reception slot so as not to collide with the set situation thereof, and autonomously engaging in time division multiplex communication with other wireless communication apparatuses located at the neighborhood, so there is the advantage that time division multiplex connection method by asynchronous control of communication apparatuses in the autonomous distributed network can be easily realized.

Further, by providing a frame period common to all apparatuses, dividing the frame to slots of further shorter time units, and communicating in units of the slots, it is possible to communicate with a high random accessability on a wireless transmission channel while forming an ad hoc network without synchronization with the surrounding apparatuses.

Further, by providing a frame period common to the wireless communication apparatuses and periodically transmitting beacons at the timing of the head of the frame period, all wireless communication apparatuses can obtain a grasp of the existence of the other wireless communication apparatuses located at their neighborhood.

Further, by periodically transmitting beacons in the frame period set by each apparatus and setting at least one reception slot for reception by a communication apparatus, it is possible to utilize other regions for communication of the other apparatuses and possible to improve the repeat utilization efficiency of a wireless transmission channel.

Further, by providing any scanning period in each apparatus and performing continuous reception (scanning) in units of frame periods, it is possible to obtain a grasp of other apparatuses located at the neighborhood.

Further, even if deviation occurs in the operating clock with other apparatuses, by ignoring the past scan information and making the newest scan information valid, communication is possible without regard as to clock deviation with other apparatuses.

From the above, a wireless communication system and wireless communication method for communicating without among a plurality of apparatuses requiring clock correction can be realized.

Industriral Applicability

The present invention enables communication with a high random accessability on a wireless transmission channel while forming an ad hoc network without synchronization with surrounding apparatuses, enables all communication apparatuses to obtain a grasp of the existence of the other communication apparatuses located at their neighborhood, enables improvement of the repeat utilization efficiency of the wireless transmission channel, enables a grasp of other apparatuses located at the neighborhood to be obtained, and enables communication without regard as to clock deviation with other apparatuses, therefore the present invention can be applied to a system for communication with other wireless communication apparatuses in an autonomous distributed network without a specific control station apparatus.

List of References

10 . . . wireless communication system
11 to 18, 100 . . . wireless communication apparatus
101 . . . time counting portion
102 . . . frame managing portion
103 . . . information storage portion
104 . . . interface
105 . . . transmission buffer
106 . . . slot managing portion
107 . . . reception buffer
108 . . . beacon generating portion
109 . . . beacon analyzing portion
110 . . . wireless transmitting portion
111 . . . timing control portion
112 . . . wireless receiving portion
113 . . . antenna, FLMP frame period
SCNP . . . scan period
BLST . . . beacon slot
DSLT . . . data slot
SCNF . . . scan frame
NRMF . . . normal frame
BCN . . . beacon
RSLT . . . reception slot
200 . . . beacon information
201 . . . communication apparatus address (CMADR)
202 . . . beacon period information (BPI)
203 . . . reception slot number (RSN)
204 . . . reservation region (RSV)
205 . . . CRC
300 . . . data information
301 . . . MAC header information (HDI)
302 . . . data payload (DPLD)
303 . . . CRC

The invention claimed is:

1. A wireless communication apparatus for communicating with another wireless communication apparatus in an autonomous distributed network without a designated control station apparatus,
said wireless communication apparatus comprising:
frame period setting means for setting a frame period for the wireless communication apparatus;
data slot setting means for setting slots serving as data transmission units;
scan period setting means for setting a scan period, the scan period being longer than said frame period;
scan operation period setting means for setting a scan operation period to engage in a continuous receiving operation over a time of the frame period;
reception slot setting means for setting at least one reception slot for receiving a signal in said frame period; and
beacon generating portion for generating a beacon signal that includes the reception slot information and the frame period information.

2. The wireless communication apparatus as set forth in claim 1, further comprising:
transmitting means for transmitting a beacon signal to another wireless communication apparatus at a predetermined timing of said frame period, wherein the beacon signal has information about a timing of the reception slot set by said reception slot setting means; and
receiving means for receiving a signal transmitted by said another wireless communication apparatus.

3. The wireless communication apparatus as set forth in claim 2, wherein said receiving means receives the signal at a timing of the reception slot set by said reception slot setting means.

4. The wireless communication apparatus as set forth in claim 1, further comprising beacon transmitting means for transmitting a beacon signal at a timing of a head of the frame period.

5. The wireless communication apparatus as set forth in claim 1, further comprising:
data transmitting means for transmitting data to another wireless communication apparatus,
storage means for storing timings of reception slots of other wireless communication apparatuses, and
control means for making said data transmitting means transmit data at a timing of a reception slot of said another wireless communication apparatus when there is transmission data to be sent to the other wireless communication apparatus.

6. A wireless communication apparatus for communicating with another wireless communication apparatus in an autonomous distributed network without a designated control station apparatus,
said wireless communication apparatus comprising:
frame period setting means for setting a frame period for the wireless communication apparatus;
data slot setting means for setting slots serving as data transmission units;
scan period setting means for setting a scan period longer than said frame period;
scanning means for receiving a beacon signal transmitted from another wireless communication apparatus in a scan operation period set in a continuous receiving operation over a time of said frame period;
beacon analyzing portion for analyzing the received beacon signal that includes the reception slot information and the frame period information; and
reception slot setting means for setting at least one reception slot for receiving a signal in said frame period.

7. The wireless communication apparatus as set forth claim 6, further comprising:
managing means for converting a timing of said received beacon signal and a timing of the reception slot into its own slot positions and managing same; and
transmitting means for transmitting a signal at the timing of the reception slot of the corresponding wireless communication apparatus when there is data directed to another wireless communication apparatus.

8. The wireless communication apparatus as set forth in claim 7, further comprising control means for making said transmitting means transmit a signal at the timing of the reception slot of the corresponding wireless communication apparatus when there is data directed to the other wireless communication apparatus,
the scanning means obtaining the timing of the beacon signal and the timing of the reception slot from said other wireless communication apparatus.

9. The wireless communication apparatus as set forth in claim 6, further comprising beacon transmitting timing control means for controlling a timing of transmission of its own beacon so as not to collide with the beacon of the other wireless communication apparatus, wherein
the scanning means receives a beacon from the another wireless communication apparatus.

10. The wireless communication apparatus as set forth in claim 6, further comprising transmitting means for transmitting the beacon signal at a predetermined timing of the frame period, wherein the beacon signal has information relating to a beacon transmitting slot transmitted from another wireless communication apparatus obtained by said scanning means.

11. A wireless communication system for communication among a plurality of wireless communication apparatuses in an autonomous distributed network without a designated control station apparatus, wherein
each of the wireless communication apparatus configuring the network comprises:
frame period setting means for setting a frame period for the wireless communication apparatus;
data slot setting means for setting slots serving as data transmission units;
beacon slot setting means for setting beacon slots for transmitting beacon signals at a predetermined timing of said frame period;
reception slot setting means for setting at least one reception slot for receiving a signal in the receiving operation in said frame period;
beacon generating portion for generating a beacon signal that has information about a timing of a reception slot set by said reception slot setting means and the frame period information;
transmitting means for transmitting the beacon signal informing its presence to another wireless communication apparatus in the neighborhood;
scan period setting means for setting a scan period longer than said frame period;
managing means for managing a timing of receiving a beacon signal of another wireless communication apparatus in the neighborhood and timing of the reception slot, and for performing continuous reception over a time of said frame period and receiving a beacon signal of another wireless communication apparatus in the neighborhood in a scan operation period set over a time of said frame period; and beacon analyzing portion for analyzing the received beacon signal that includes the reception slot information and the frame period information.

12. The wireless communication system as set forth in claim 11, wherein the system transmits the beacon signals at a timing of a head of said frame period.

13. The wireless communication system as set forth in claim 12, wherein timings by which wireless communication apparatuses transmit beacon signals are arranged so as not to overlap each other.

14. A wireless communication method for communication among a plurality of wireless communication apparatuses in an autonomous distributed network without a designated control station apparatus, wherein each wireless communication apparatus being operable for:
    setting a frame period and slots serving as data transmission units for the wireless communication apparatus;
    setting a beacon slot for transmitting a beacon signal at a predetermined timing of said frame period;
    setting reception slot for receiving a signal in a receiving operation in said frame period;
    setting a scan period longer than said frame period;
    setting a scan operation period to engage in a continuous receiving operation over a time of the frame period; and
    generating a beacon signal that includes the reception slot information and the frame period information.

15. The wireless communication method as set forth in claim 14, further comprising transmitting a beacon signal that has information about timing of the set reception slot and informing its presence to another wireless communication apparatus located in the neighborhood.

16. The wireless communication method as set forth in claim 14, further comprising having a wireless communication apparatus that engages in reception processing at a timing of said set reception slot and receives data transmitted from another wireless communication apparatus.

17. The wireless communication method as set forth in claim 14, wherein the system transmits a beacon signal at a timing of a head of said frame period.

18. A wireless communication method for communication among a plurality of wireless communication apparatuses in an autonomous distributed network without a designated control station apparatus, wherein each wireless communication apparatus being operable for:
    setting a frame period and slots serving as data transmission units for the wireless communication apparatus,
    setting a scan period longer than said frame period, and the scan period setting in a scan operation period performing scan processing for continuous receiving operation over a time of said frame period,
    receiving a beacon signal transmitted from another wireless communication apparatus located in the neighborhood in the scan operation period,
    analyzing the received beacon signal that includes the reception slot information and the frame period information, and
    setting at least one reception slot for receiving a signal in said frame period.

19. The wireless communication method as set forth claim 18, further comprising a step of managing a timing of the reception of the beacon signal transmitted from said other wireless communication apparatus and a timing of the reception slot.

20. The wireless communication method as set forth in claim 18, comprising steps of:
    storing a timing of a beacon signal from another wireless communication apparatus located in the neighborhood and a timing of the reception slot and
    engaging in a transmitting operation at a timing of the reception slot of the another communication apparatus when there is data destined for the another wireless communication apparatus.

21. A wireless communication method for communication among a plurality of wireless communication apparatuses in an autonomous distributed network without a designated control station apparatus, comprising, at each wireless communication apparatus, the steps of:
    setting a frame period and slots serving as data transmission units for the wireless communication apparatus,
    setting a beacon slot for transmitting a beacon signal at a timing of head of said frame period and a reception slot for receiving a signal in a receiving operation in said frame period,
    generating a beacon signal that has information about a timing of the set reception slot and the frame period information,
    transmitting the beacon signal that notifies its existence to another wireless communication apparatus located in the neighborhood,
    setting a scan period longer than said frame period and performing scan processing for continuous reception over the time of said frame period,
    receiving a beacon signal from another wireless communication apparatus located in the neighborhood in a scan operation period set over a time of said frame period, and
    analyzing the received beacon signal that includes the reception slot information and the frame period information.

22. The wireless communication method as set forth in claim 21, further comprising steps of:
    managing a timing of the reception of said beacon signal of the another wireless communication apparatus located in the neighborhood and a timing of the reception slot, and
    transmitting a signal at the timing of the reception slot of the corresponding wireless communication apparatus when communicating directed to the another wireless communication apparatus.

23. The wireless communication method as set forth claim 21, further comprising the step of receiving a beacon from another wireless communication apparatus by said scanning processing and controlling a timing of transmission of its own beacon so as not to collide with the beacon of the another wireless communication apparatus.

24. The wireless communication method as set forth in claim 21, further comprising the step of transmitting a beacon signal at a predetermined timing of the frame period, wherein the beacon signal has information relating to a beacon transmitting slot transmitted from another wireless communication apparatus obtained by said scanning processing.

* * * * *